July 24, 1962

D. U. NORGREN 3,045,528

DARK-FIELD ILLUMINATION SYSTEM

Filed April 14, 1959

INVENTOR.
DUANE U. NORGREN

BY

ATTORNEY.

July 24, 1962  D. U. NORGREN  3,045,528
DARK-FIELD ILLUMINATION SYSTEM
Filed April 14, 1959  3 Sheets-Sheet 2

INVENTOR.
DUANE U. NORGREN
BY
ATTORNEY.

July 24, 1962

D. U. NORGREN 3,045,528

DARK-FIELD ILLUMINATION SYSTEM

Filed April 14, 1959

INVENTOR.
DUANE U. NORGREN
BY

ATTORNEY.

United States Patent Office

3,045,528
Patented July 24, 1962

3,045,528
DARK-FIELD ILLUMINATION SYSTEM
Duane U. Norgren, Berkeley, Calif., assignor to the United States of America as represented by the United States Atomic Energy Commission
Filed Apr. 14, 1959, Ser. No. 806,409
10 Claims. (Cl. 88—1)

The present invention relates to apparatus for illuminating transparent or translucent objects which are to appear light in contrast to a dark background and, more particularly, to an illumination system for facilitating the viewing of particle tracks within particle detectors such as bubble chambers, cloud chambers, and the like.

To facilitate the study of nuclear interactions and related phenomena, a variety of instruments have been developed for making visible the paths taken by nuclear particles moving through a medium. From the visible path, or "track" such properties as the mass, energy, and charge of the particle may frequently be established and the interactions of the particles with other nuclei may be observed and studied. A widely used instrument of this type is the cloud chamber in which the particles pass through a region supersaturated with vapor and droplets of liquid condense along the trajectory of the particle thus forming the visible track which may be observed and measured.

A newer, and in many ways superior, instrument of this class is the bubble chamber which operates on a somewhat analogous principle. In the bubble chamber the particles pass through a superheated liquid and, in interacting with the liquid, form tiny vaporization pockets which immediately expand into minute but observable bubbles. The bubbles collectively form visible tracks in the liquid which tracks represent accurate trajectories of the particles and provide much useful information such as the mass, energy, charge, and half-life of the particles.

In both the bubble chamber and the cloud chamber particle tracks are short-lived and are not always easily distinguishable from the background medium; therefore, illumination systems are required which act to contrast the tracks with the background as much as is possible in order that photographs may be taken for subsequent study. One such illumination system uses the dark field technique and is extremely valuable for illuminating transparent or translucent objects which cannot be made sufficiently distinguishable by straight-forward conventional illumination.

In the conventional dark-field system of bubble chamber illumination a viewing means, ordinarily one or more cameras, is arranged to view a light-absorbent surface through the active, or particle sensitive, region of the chamber; hence the term dark field. Light from an external source is directed into the chamber at an angle such that none of the entering light directly strikes the camera lenses. Light rays traversing bubbles or droplets, if not passing centrally therethrough, are refracted and scattered so that some refracted rays reach the camera lenses. Since the latter rays travel directly from the bubbles to the camera, the bubbles appear as bright spots contrasted to the dark background from the point of view of the camera. Particle tracks are thus adequately differentiated from the background, and photographs may be made from which information on the bubble forming particle may be calculated.

Heretofore, bubble chambers and related apparatus of the class employing dark-field illumination have been illuminated by a light source placed at a first window and viewed by one or more cameras situated at a second window which is located on the opposite side of the vessel from the first window in order that the camera will be within the narrow cone of light forwardly scattered by the bubbles. In large and complex bubble chambers, however, space restrictions brought about by associated structures such as a magnet make it highly desirable that a single window be utilized for both illumination and viewing. Such a system eliminates the need for two widely separated windows with the attendant duplication of clamps, seals, etc. Further virtues of a one window system include very great reductions in the cost of chamber construction, increased safety due to a reduced probability of window failure, and a very significant increase in available heat transfer in the chamber when a metal surface is substituted for glass, which thermal characteristic is highly desirable in the operation of the chamber.

If, however, the camera and light source are to utilize the same window of the chamber, several difficulties are encountered. Since with a preferred fluid medium, liquid hydrogen, the index of refraction of the bubbles is very close to that of the surrounding fluid, little backscattering of light from the bubbles occurs. As a result, the bubbles cannot be adequately distinguished from the background through the medium of light returned directly by the bubbles to a camera located close to the source. Since the scattering of light by the bubbles is largely confined to a narrow cone extending forwardly from the bubbles with respect to the direction of the incident light, such light must be incident on the bubbles from a direction almost opposite the camera if the bubbles are to be clearly visible thereto. The light cannot, however, be directed straight into the camera or the necessary dark background will not be present. Thus the optical requirements seemingly require that the camera and light source be at opposite sides of the chamber and therefore that the chamber have two windows.

The present invention, however, provides a means for situating the camera and light source in close proximity by providing for a virtual light source at the opposite side of the chamber. The virtual source acts to return, or retro-direct, light from the real source back in the general direction of the real source and thus is effectively a light source situated at the opposite side of the chamber from the camera. If the camera is displaced to one side of the real light source, it will not receive the returned light except for that portion which has been scattered by a bubble and will thus record the bubbles as light images against an otherwise dark background.

In order for the foregoing condition to be achieved, the virtual light source must have the further property of suppressing light which is received from any direction other than that of the real source. Thus the virtual source cannot be a simple mirror since such a mirror would give rise to dislocated virtual bubble images through the medium of light scattered by the bubbles prior to the retro-direction of the light. Thus in the present invention, the light retro-directing means has the unique property of returning only such light as is received directly from the source, all other light being directed to absorptive surfaces. While the retro-directing element can take several forms, examples of which are hereinafter described in detail, each such form is characterized by reflective surfaces which return direct light toward the source and by refractive surfaces which direct such light to the reflective surfaces while directing all other light to absorptive surfaces.

It is an object of this invention to facilitate the detection and study of nuclear particles and radiations.

It is an object of the present invention to provide an improved means for illuminating objects which are to appear bright in contrast to a dark background.

It is an important object of this invention to provide means making possible the construction of bubble chambers, cloud chambers and the like with but a single transparent window whereby the construction costs thereof are reduced, thermal characteristics are improved, and flexibility and convenience of operation are substantially increased.

Still another object is to provide an improved means for illuminating tracks made by nuclear particles in bubble chambers, cloud chambers, and the like.

It is another object to provide an improved dark field illumination system for particle detectors of the bubble chamber class which system suppresses virtual images and other unwanted light, and maximizes desired real images.

An important object of this invention is to provide a dark field optical system for illuminating bubble tracks in a single window bubble chamber in which the light source and optical viewpieces utilize the same window.

Still another object of the invention is to provide light retro-direction means for selectively directing light through transparent objects to be viewed which light is directed to said objects at a preferred angle of incidence.

The invention, both as to its organization and method of operation, together with further objects and advantages thereof, will be best understood by reference to the following specification taken in conjunction with the following drawing, in which.

Figures 1, 2, 3, 4:
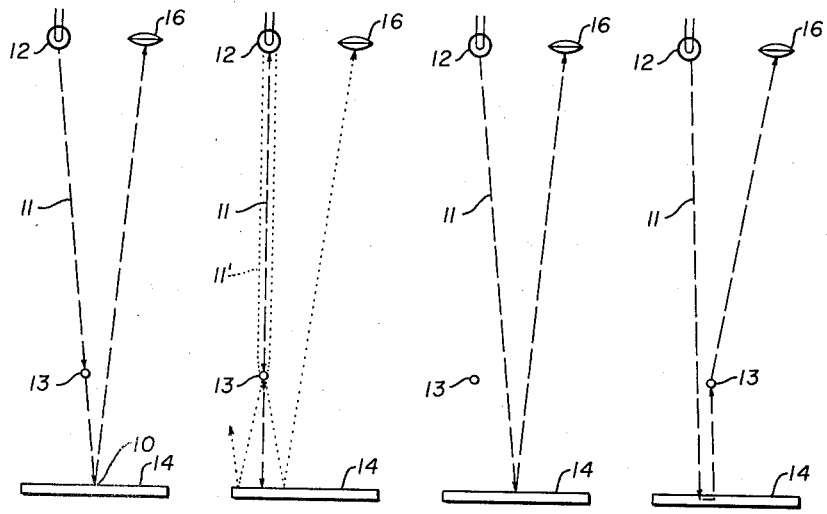
FIGURE 1 is a diagrammatic illustration of a first possible optical condition in a bubble chamber.
FIGURE 2 is a diagrammatic illustration of another possible optical condition in the chamber.
FIGURE 3 is a diagrammatic illustration of still another possible optical condition in the chamber.
FIGURE 4 is a diagrammatic illustration of another optical condition in the chamber, which condition is preferred and which is characteristic of the present invention.

Referring now to the drawing, FIGURES 1 through 4 are diagrammatic illustrations of various optical conditions which might occur in an arrangement where a light source or lamp 12 and a viewing lens 16 must be situated fairly close together and in which an optical element 14 is disposed a distance away from the lamp 12 and lens 16 for the purpose of returning light from the lamp back in the general direction of the lamp. As has been hereinbefore discussed, this general arrangement is required where only a single window is to be present in the bubble chamber and dark-field illumination is to be achieved. Thus in FIGURES 1 to 4, the region adjacent lamp 12 and lens 16 corresponds to the bubble chamber single window and the region intermediate between the lamp or lens and the element 14 corresponds to the sensitive region of the bubble chamber in which region bubbles 13 are to be illuminated and observed. As has been discussed, the index of refraction of the bubbles 13 with respect to the surrounding fluid medium is usually such that the bubbles cannot be adequately observed by means of light which simply travels from the lamp 12 to the bubble and is returned thereby to the lens 16. Thus the light retro-directing element 14 must be utilized at the opposite side of the sensitive region of the bubble chamber to provide a virtual source of light opposite the viewing lens.

It is apparent, however, that several unique properties are demanded of the light retro-directing element 14 if dislocated bubble images are to be kept from the lens 16 and if the dark character of the background is to be maintained. Thus the element 14 cannot be a simple reflector or mirror.

Referring now to FIGURE 1 in particular, there is shown a first condition which would exist if the element 14 were, for example, a simple mirror, the condition being one which must be suppressed. It will be observed that a light ray 11 from the light source 12 may traverse the center of a bubble 13 in transit to the optical element 14 and be reflected therefrom to the lens 16, which lens then receives a virtual image of the portion of the bubble 13. The bubble portion appears to be located below the element 14 a distance equal to the vertical distance between bubble 13 and element 14 and on a line normal to element 14 and passing through bubble 13. In addition to causing the bubble 13 to appear translocated, such virtual images would lessen true bubble image contrasts on photographs, the undesirable virtual images not only appearing as superfluous luminous points on a dark field but also often causing true images, by intersection therewith and superimposition thereon, to appear blurred or otherwise distorted. One of the prime requisites of an efficient illumination system, therefore, is such that virtual images be reduced to a minimum.

A second undesirable condition is shown in FIGURE 2. If a ray 11 from the light source 12 is normal to the optical element 14 and, enroute thereto, traverses the center of a bubble 13, then the ray 11 is reflected back centrally through the bubble 13 to the light source 12. As the reflected ray 11 does not enter the lens 16, this optical condition does not distort a dark background, but obviously the ray 11 is also not useful in rendering the bubble 13 visible to the lens 16. It is more probable, however, that another incident ray 11', as shown by the dotted lines in FIGURE 2, will not centrally traverse the bubble 13, but will instead pass asymmetrically through the bubble in which event the ray 11' is refracted by the bubble and subsequently travels in a direction differing from the direction of travel maintained prior to incidence on the bubble. Such ray will therefore be incident on optical element 14 at an off-normal angle thereto and may be redirected thereby to the lens 16, whereby the virtual image condition, as was shown in FIGURE 1, obtains. As will be shown, the present invention also minimizes this deleterious optical condition.

FIGURE 3 illustrates a further and highly significant undesirable condition. A ray 11 may bypass a bubble 13 both before and after reflection, and enter the lens 16, thereby effectively destroying the dark background, and thus the desired contrast. This optical condition is also minimized by the present invention.

Referring now to FIGURE 4, a desirable optical condition is illustrated in which a ray 11 traverses a bubble 13 only after reflection and is refracted by the bubble into the lens 16, which lens then sees the bubble instead of a virtual bubble image or a light source image.

From the foregoing discussion it may be seen that the element 14 should have the property of suppressing the deleterious light paths illustrated in FIGURES 1 to 3 and of permitting the light path illustrated in FIGURE 4. Accordingly, in the present invention a system has been devised which promotes the optical condition illustrated by FIGURE 4 and which suppresses virtual images and light source images produced by light ray paths exemplified by FIGURES 1, 2, and 3. Selective light retro-direction means is utilized to suppress undesirable light rays 11 and 11' (FIGS. 1–3) by directing all such rays to light absorptive surfaces in some cases or back to the light source 12 in others, and is utilized to optimize desirable rays (FIG. 4) by directing these rays toward the region of the light source 12 whereby a bubble 13 intercepting such retro-directed rays scatters the rays toward the camera lens 16, and is thereby seen as a light image against an otherwise dark background.

The particular embodiment of the invention hereinafter described functions to illuminate nuclear particle tracks in a detector of the bubble chamber class, but it should be understood that this particular exemplary adaptation of the optical system is not exhaustive of the applications thereof.

Figure 5:
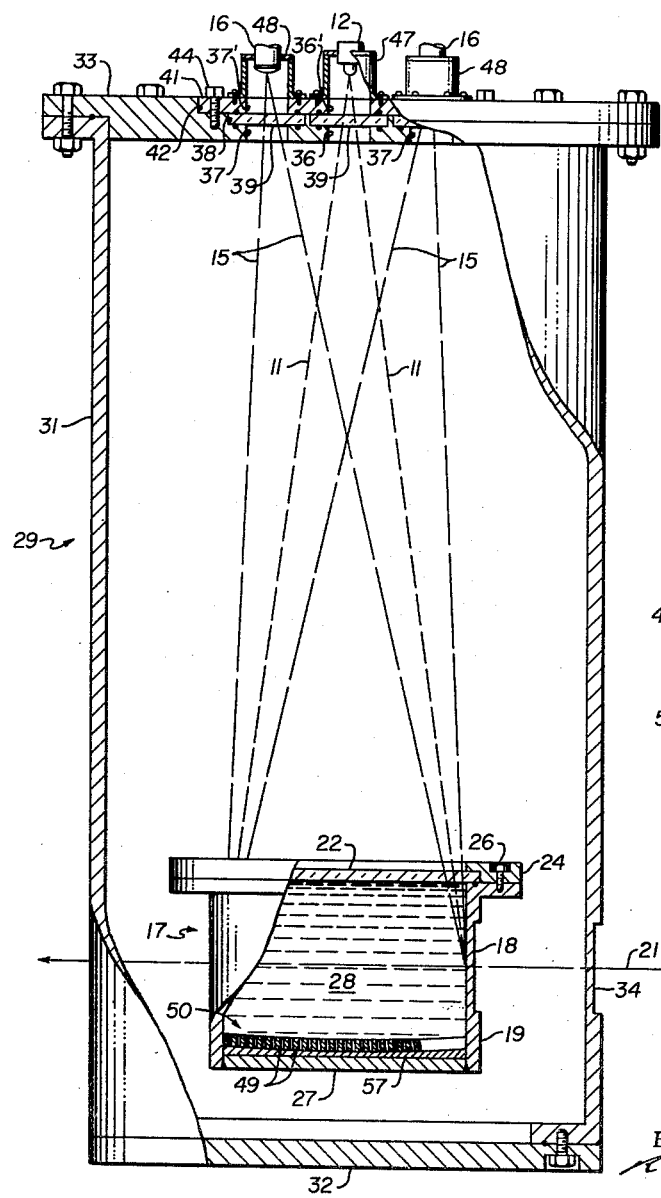
FIGURE 5 is a broken-out view of certain elements of a bubble chamber utilizing the present invention, with portions of such chamber shown in section.

Referring now to FIGURE 5, certain of the elements of a bubble chamber are shown, portions of the chamber which are not operatively related to the present invention being omitted to avoid unnecessary complication. A hollow cylindrical vessel 17 defines the sensitive region of the bubble chamber, which vessel is flanged at the upper extremity and which has a circular thin wall section 18 set in the sidewall 19 thereof. The vessel 17 is disposed, in this instance, with the axis vertical and with the thin wall section 18 transverse to a beam 21 of nuclear particles which are to be studied. A flat circular transparent window 22 sealingly closes the upper end of the vessel 17, and is held in place by an annular clamp ring 24 which bears against the periphery of the transparent window 22 and which is secured to the flanged portions of the vessel sidewall 19 by the spaced bolts 26.

The vessel 17 is filled with a radiation-sensitizable medium 28, in this instance liquefied hydrogen, although other liquids are suitable. The liquid hydrogen 28 is periodically lowered in pressure by conventional means associated with the chamber to produce a superheated condition at which a nuclear particle entering the vessel 17 through the thin wall 18 produces a trail of minute bubbles in the hydrogen, which bubble trail is indicative of the trajectory of the particle through the vessel.

The vessel 17 connects with other apparatus necessary for accomplishing the above-described operation, certain elements of such apparatus being enclosed by a hollow cylindrical vacuum tank 29 having a sidewall 31, a thick bottom endwall 32, and a thick cover plate 33. Disposed in the vacuum tank sidewall 31 in alignment with the ionizing radiation beam 21 is a circular thin wall 34 similar to the vessel thin sidewall 18. The detailed structure of a bubble chamber, including the said apparatus for effecting a state of superheat in the hydrogen is well known to those skilled in the art and may be studied by reference to The Physical Review 92, 517 (1953) by R. H. Hildebrand and D. E. Nagle.

The vacuum tank 29 serves, from an optical standpoint, as a light-tight enclosure for the dark-field optical apparatus to be hereinafter described. Accordingly, the tank cover plate 33 is provided with suitable apertures for the placement of illuminating and viewing components of the optical aparatus. The cover 33 has an expansive central circular recessed area 42 within which is a smaller center aperture 36 and two side apertures 37 which apertures are uniformly spaced along a common diameter of the cover. Each of the three apertures 36 and 37 is provided with an annular step 38 into which is fitted one of three matching circular glass windows 39. A removable circular center plate 41 is sealingly fitted into the recessed area 42 and is secured to the cover 33 by spaced bolts 44. Apertures 36' and 37' formed in the removable center plate 41 match the tank cover plate apertures 36 and 37, respectively, thereby providing an unobstructed view from the outside of the tank cover 33 through each window 39 to the vessel 17.

Disposed above the center port windows 39 and bolted to the removable center plate 41 is a cylindrical housing 47 which serves as a light-tight enclosure and support for a projection lamp 12. Light from the lamp 12, as defined by rays 11, is projected downward through the center port 39 and through the transparent window 22 of vessel 17 to the bottom wall 27 of the vessel, the ray lines 11 thus defining a cone having as an apex the lamp 12.

A pair of cameras, of which only the lenses 16 are shown in FIGURE 5, are positioned to view the vessel 17 through ports 39, the lens of each camera being transpierced through a light-tight unit 48 having interior light absorbent surfaces, which unit is disposed above each of the two side ports 39, the units being bolted to the removable center plate 41. Each lens views the bottom wall 27 of the vessel 17, as indicated by ray paths 15 in the drawing.

Those surfaces within the vacuum tank 29 and inside and outside the vessel 17 which are exposed to the camera lenses 16 are treated with a light-absorbent material, such as carbon or dark metallic oxide. A glare reducing coating is provided on the transparent window 22 of the vessel 17 and on the three ports 39, magnesium fluoride being a suitable material. As in conventional dark-field optical systems, no extraneous light should penetrate the boundaries of the dark field, which field, in the present embodiment, is enclosed by the vacuum tank 29 and by the lamp and camera lenses housing units 47 and 48.

Figure 6:
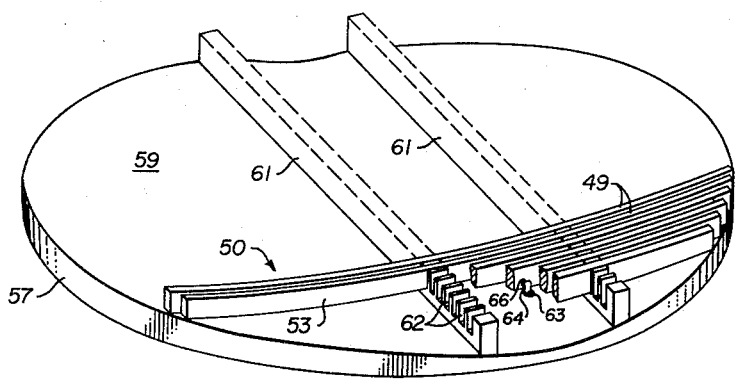
FIGURE 6 is an enlarged perpective view of a portion of the apparatus of FIGURE 5 showing the structure of a light retro-direction means within the bubble chamber.

In order that bubbles produced by the nuclear beam 21 be illuminated in contrast to the dark background viewed by the camera lenses 16, the light 11 entering the vessel 17 must be retro-directed back in the direction of the lamp but not directly to the camera lenses 16, the light retro-direction means preferably minimizing the undesirable optical conditions hereinbefore discussed with reference to FIGURES 1, 2, and 3 and maximizing the FIGURE 4 condition. Accordingly, there is shown in FIGURES 5 and 6 an array 50 of lenses 49 disposed in the bottom of the vessel 17, which lens array, as will be seen, selectively retro-directs light in accordance with desired optical conditions resulting in an efficient illumination of particle tracks in the vessel.

The lens array 50, as will hereinafter be discussed in more detail, may take several forms with respect to the nature of the individual component lenses, all such forms being related with respect to the resultant exterior ray paths. In the embodiment shown in FIGURE 5, the array 50 is comprised of a plurality of long arcuate lenses 49 positioned closely together in parallel relationship, each such lens having a curvature along the long axis which is centered on the apparent postion of the lamp 12 at the top of the chamber.

Figure 7:
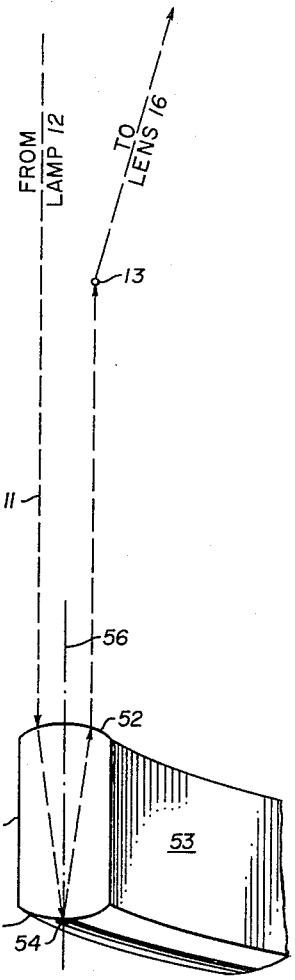
FIGURE 7 is an enlarged perspective view of a portion of the light retro-direction means shown in FIGURE 6, with a diagrammatic illustration of a light ray path therein.

Referring now to FIGURE 7, the cross-sectional configuration of an individual lens 49, as well as the optical action of the lens, is shown in more detail. Each such lens 49 is characterized by having two opposed convex faces, an upper face 52 and lower face 51 which are separated by a substantial thickness 53 of transparent material, acrylic resin being a suitable material for the lens. Materials other than lucite are suitable, for example glass; however, the material used should be highly polishable and should be chemically inert in the liquid medium 28 used in the vessel 17. A strip 54 is disposed along the center of the lower lens face 51 which strip is coated with highly polished reflective metal, in this instance aluminum. The remaining surfaces of the lens 49, excluding the upper convex face 52, are coated with a light-absorbent material such as optical black lacquer. The upper face 52 is exposed to the lamp 12 and, incident light therefrom as defined by ray paths 11, the lens face being ellipsoidally curved to provide aplanatic optics.

As will be hereinafter discussed with reference to the mounting of the lenses within the vessel, the optical axis of the lens 49 is directed toward the lamp 12 and lens parameters are chosen so that a ray 11 straight from the lamp 12 and incident on the upper lens face 52 is refracted to the concave reflecting strip 54 on the lower lens face 51, and is thus reflected back to the upper face 52 and emerges from this face, again refracted, back toward an area contiguous to the lamp 12, the retro-directed ray path being substantially parallel to the ray path preceding retro-direction. In being retro-directed, the ray 11 is laterally displaced by the lens 49 unless the ray incident on the refractive face 52 is in alignment with the lens optical axis 56.

The property of laterally displacing the light ray 11 is a notable feature of the lens since in theory if the ray were returned on the precise path along which it arrived no returning ray could serve to illuminate a bubble as it would have been scattered by the same bubble on the way to the lens. In a beam of light a substantial number of the retro-directed rays traverse a bubble 13 and are thereby scattered forwardly by the bubble, the usable scattering being within an optical cone having an angle dependent upon the index of refraction of the bubble (gas) and the index of refraction of the liquid medium, in this instance of liquid hydrogen at around 27° K. The camera lens 16 is accordingly located within the scattering cone, but far enough away from the lamp 12 to prevent reception of retro-directed light which has not been scattered by a bubble. FIGURE 7 shows a retro-directed ray 11 deflected by a bubble 13 to the camera lens 16, wherein a true bubble image is thus received.

Light rays refracted by bubbles enroute to the retro-directive lens 49 enter the lens upper face 52 at a comparatively acute angle thereto, and are thus refracted to the light absorbent surfaces away from the lens reflecting strip 54 of the lower face 51, the strip having a selected width whereby this optical condition obtains. As these bubble-image-carrying rays are thus not retro-directed by the lens 49, virtual images, i.e., apparently dislocated images, are not received by the camera lens 16.

Referring again to FIGURES 5 and 6, the retro-directive lenses 49 are shown mounted on a circular baseplate 57, which plate covers the upper surface of the vessel bottom wall. The lenses 49 are parallel and have varying lengths suited to extend across the upper surface 59 of the baseplate 57. The lenses 49 are bowed such that the length of each lens is an arc of a circle concentric with the apparent position of lamp 12; and, with the exception of the center lens which is vertical, the lenses are individually tilted toward the lamp 12. Thus an extension of the optical axis for any cross-section of any lens passes through the lamp 12. The upper surface 59 of the baseplate 57 is preferably concave, as shown in FIGURE 6, to best fit the bowed lenses 49.

To support the retro-directive lenses 49 in the position described, two spaced apart crosspieces 61 are attached to the upper surface 59 of the baseplate 57, the crosspieces being arranged perpendicular to the direction of the lenses 49. Closely spaced along the crosspieces 61 are substantially vertical slots 62 through which the lenses 49 pass. The slots 62 are inclined to point toward the lamp 12 in order that the lenses 49 fitted therein are properly oriented. To secure a lens 49 within a slot 62, there is bolted to the baseplate 57 midway along the lens a bracket 63 having an angled flat arm 64 fitted into a lateral slit 66 formed in the lens wall 53.

Considering now the preferred orientation of the retroflex lenses 49 with respect to the camera lenses 16, it will be found that some small proportion of the light from lamp 12 is reflected from the upper faces 52 of the retroflex lenses and that such reflected light, in the plane of the camera lenses, is somewhat concentrated along two bands which intersect at the lamp, one of the bands being parallel to the direction of alignment of the central retroflex lens and the other being perpendicular thereto. The camera lenses should not lie along either of the two bands and to prevent this condition, the retroflex lenses 49 are aligned at a forty-five degree angle with respect to the plane defined by the optical axes of the two camera lenses.

It should be understood that various other mechanical means within the skill of the art are suitable for mounting and orienting the lenses 49 within the vessel 17. In general, all lens mounting surfaces and the top surface 59 of the baseplate 57 should be coated with light absorbent materials, as in the present embodiment.

In certain embodiments of the invention the number of cameras 16 may exceed two. Stereoscopically, this results in a somewhat stronger spacial determination for nuclear particle tracks than can be achieved with two cameras.

The invention is not limited to the use of the retro-directive lenses 49 in the form described, as certain other light retro-directive means can be substituted to give substantially the same effect as the lens, among which means are Porro prisms, transparent beads, and circular reflecting grooves. The member used in each case must have a configuration, index of refraction, and orientation whereby non-refracted light rays 11 coming straight from the lamp 12 are slightly laterally displaced and are directed back toward the lamp 12 area and whereby any rays arriving from other than the direction of the lamp will be deflected to light absorbent surfaces.

Figure 8:
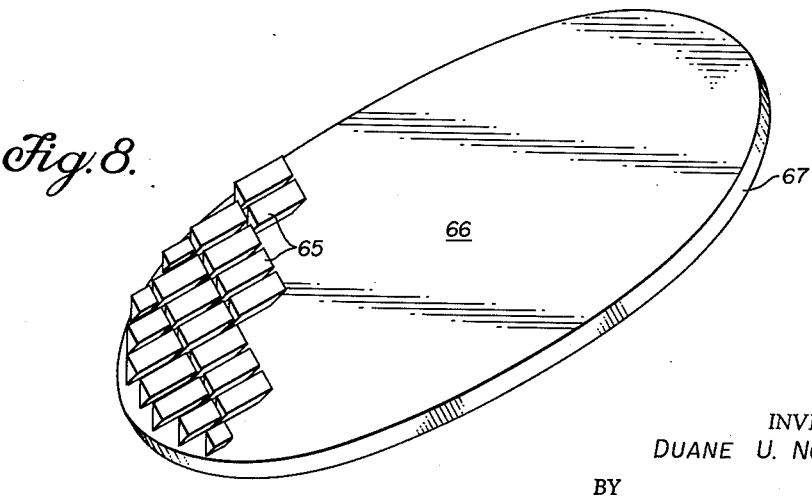
FIGURE 8 is an enlarged perspective view of a second form of light retro-direction means usable in the bubble chamber of FIGURE 5.

Considering now an example of an alternate light retro-directing structure, there is shown in FIGURE 8 an array of prisms 65 disposed on the top surface 66 of a circular flat baseplate 67, which assembly may replace the retro-directive lenses within the bubble chamber vessel 17. The prisms are disposed in a substantially parallel relationship with each other and those near the periphery of the baseplate are of smaller size in order to attain maximum coverage of the baseplate surface 66.

Figure 9:
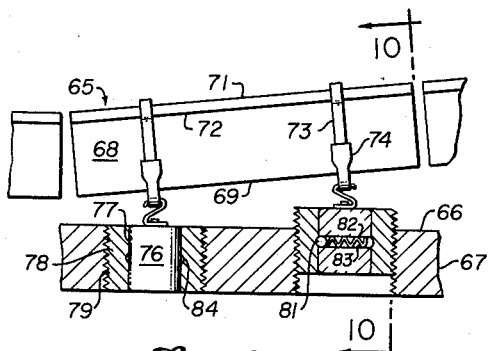
FIGURE 9 is a side elevation view of a component of the second form of light retro-direction means shown in FIGURE 8 and showing a suitable mounting means therefor.
Figure 10:
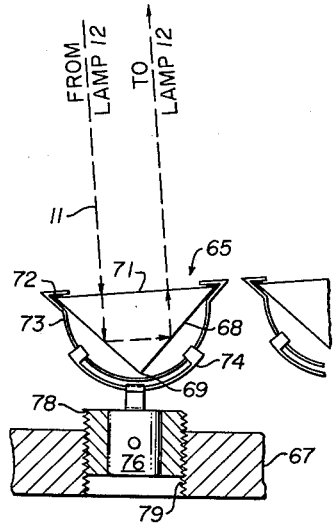
FIGURE 10 is a view taken along line 10—10 of FIGURE 9 and further clarifying the structure of the second form of light retro-direction means.

As shown in FIGURES 9 and 10, each prism 65 has, in cross section, a right triangular configuration with side surfaces 68 forming an apex 69 together with hypotenuse face 71, the margins of the face 71 being protected by a thin light absorbent angled strip 72. Two semi-circular clips 73, each being adjustably attached to a saddle member 74, which is in turn attached to an upright post 76, grip the prism on the masked edge near each end thereof, whereby the apex 69 is directed downward. The post 76 fits into a bore 77 in a cylindrical sleeve 78, the sleeve being threaded into an aperture 79 transpiercing the baseplate 67. To facilitate easy insertion or removal of the post 76 two steel spheres 81 separated by a compression spring 82 are disposed at the ends of a cylindrical bore 83 which bore transpierces the post 76 and houses the compression spring, the spheres 81 bearing against a circular groove 84 formed in the sidewall of the bore 77 in the sleeve 78. Either end of the prism 65 is elevated or lowered by rotating either one or both of the threaded sleeves 78 within a sleeve aperture 79. For this operation it is normally necessary to first remove the prism support post 70 from the bore 77.

The prisms 65 are individually adjusted in the threaded sleeves 78 and in the saddles 74, such that the hypotenuse face 71 of each prism is substantially normal to a ray 11 coming straight from the lamp 12, as shown in FIGURE 10. Such a ray 11 is laterally displaced, as shown, in being retro-directed by the prism 65, and emerges from the hypotenuse face 71 at a right angle to the face, and follows a path after retro-direction by the prism substantially parallel to the path of incidence thereto, the ray 11 therefore being retro-directed toward the lamp 12. Rays substantially obliquely incident on the hypotenuse face 71, which rays will have been refracted by bubbles 13 enroute to the face, are refracted by the prism 65 at angles which deviate from perpendicularity with respect to the hypotenuse face, and thus emerge from the prism toward light absorbent surfaces of the baseplate 67, prism mounting structures, and the vessel 17 (FIGURE 5).

It can be seen that the effect of the prisms 65 is similar to that of the hereinbefore described retro-directive lenses. In both members light straight from the lamp 12 is reflected within the member, displaced laterally, and is directed back toward the lamp, a substantial amount of the retro-directed light being scattered by bubbles 13 into the camera lenses 16 wherein true bubble images are received, while light obliquely incident on the member is absorbed and thus virtual bubble images are suppressed.

It should be understood that the described thick retroflex lens assembly and triangular prism assembly are not exhaustive of the optical elements which can be utilized to perform the required retro-direction of light. Such elements as beaded reflectors or hexagonal prisms with spherical end surfaces may also be adapted to this purpose.

Thus while the invention has been disclosed with respect to an exemplary embodiment and a single modification thereof, it will be apparent to those skilled in the art that numerous variations and modifications may be made within the spirit and scope of the invention and thus it is not intended to limit the invention except as defined in the following claims.

What is claimed is:

1. In a system providing dark-field illumination of light transmissive objects within a substantially light-tight enclosure, the combination comprising a light source emitting light in said enclosure which light is directed in a beam passing through the region of said objects, an extensive light redirecting element situated on the opposite side of said region from said source, said light redirecting element having at least one reflective surface for returning light from said source back in the approximate direction of said source along said beam and having at least one refractive surface for deflecting light incident on said element from directions other than the direction of said source to light absorbent surfaces within said enclosure, and means forming a viewing aperture in said enclosure which means is on the same side of said region as said source and in proximity thereto, said means being offset in a lateral direction from the center line of said beam, whereby said system acts to make said objects clearly visible from a viewing point close to the light source, said system being operative to achieve such result under conditions wherein the back scattering of light by said objects is minimal.

2. In a nuclear particle detector of the class producing particle tracks within a fluid medium which medium is contained within a substantially light-tight vessel, a dark field illumination system comprising, in combination, a source introducing light into said vessel which light is directed towards said particle tracks in a beam centered on an axis passing through the region of said tracks, a light redirecting member disposed on the opposite side of said particle tracks from said source, said member extending over an area at least equal to that occupied by said tracks within said vessel and being disposed facing said light source, said member being characterized by reflective surfaces returning direct light from said source back in the approximate direction of said source in a beam centered on said axis and by refractive surfaces for deflecting light incident on said member from directions other than the direction of said source to light absorbent surfaces within said vessel, and means defining a viewing point which means directly views the region of said tracks and which means is situated on the same side of said region as said source and is offset laterally from said axis whereby said viewing point receives only redirected light which has been scattered by said tracks.

3. A dark-field optical system for illuminating charged particle tracks produced within the radiation sensitive fluid medium of bubble chambers, cloud chambers, and the like, said fluid medium being contained within a vessel having a transparent window at a first end thereof and having a light absorbent interior surface, said system comprising, in combination, a light source directing light into said vessel through said transparent window thereof, a light retro-directing member disposed within said vessel at a second end thereof in the path of said light, said light retro-directing member having reflective and refractive elements redirecting incident light from said source back along a path substantially parallel to the path of said incident light and directing light from directions other than that of said source to said light absorbent surface, and means providing an aperture for the viewing of the interior of said vessel through said window from a position situated outside the substantially conical region having said source as an apex and said light retro-directing member as a base and which position is offset a small distance in the lateral direction from the axis of said conical region, said system thereby acting to make said tracks visible against a dark background from a viewing point close to said source under conditions wherein the back scattering of light by said tracks is minimal.

4. In a dark-field optical system for use in a nuclear particle detector of the class forming particle tracks within a fluid medium, which fluid medium is contained within a vessel having a transparent window, the combination comprising a plurality of lenses each having a double convex cross sectional configuration, each said lens having first and second spaced apart convex faces, said lenses being disposed together forming an extensive light retro-directing member situated within said vessel and opposite said transparent window thereof with the optical axis of each said lens directed substantially toward a common reference point located outside said transparent window of said vessel and with the first convex face of each said lens closest to said point, a quantity of light reflecting material disposed along the central portion of the second convex face of each said lens, a quantity of light absorptive material disposed on the side surfaces of said lens and on said second convex face thereof, a light source situated at said reference point and directing light toward said lenses, and means establishing a viewing point which means is situated outside said transparent window and outside the paths of light returned toward said source by said retro-directing member and offset laterally from an axis passing through said reference point and the center of said light retro-directing member, said viewing means being situated within the path of retro-directed light scattered by said particle tracks.

5. In a dark-field optical system for use in the bubble chamber and cloud chamber class of nuclear particle detectors wherein charged particle tracks are produced in a radiation sensitive fluid medium, said fluid medium being contained within a vessel having a single transparent window at a first end thereof and having a light absorbent interior surface, the combination comprising, a light disposed outside said transparent window of said vessel, said light source projecting light through said transparent window into said vessel toward a second end thereof opposite said window, a plurality of parallel lenses contiguously arrayed over the interior surface of said second end of said vessel, said lenses being long arcuate segments of circles having said light source as a center, said lenses each having a thick double convex cross-sectional configuration with the optical axis of each said lens being directed substantially toward said light source, a narrow band of reflecting material disposed along each lens at the convex face thereof which is furtherest from said light source, and means for viewing the interior of said vessel said means being outside said transparent window of said vessel and outside the solid angle having as a base said lens covered surface of said vessel and having as an apex said light source whereby said viewing means receives light redirected by said lenses and scattered by said particle tracks.

6. A dark-field optical system substantially as described in claim 5 wherein said reflecting band on said furthest convex face of each said lens has a narrow width with respect to the width of said convex face whereby light incident on said lens from directions other than from the direction of said light source is refracted by said lens to said light absorbent surface of said vessel.

7. In a dark-field optical system for use in bubble chamber and cloud chamber nuclear particle detectors wherein visible charged particle tracks are produced in a radiation sensitive fluid medium, said fluid medium being contained within a vessel having a single transparent window and having a light absorbent interior surface, the combination comprising a light source directing light into said vessel toward the wall of said vessel opposite said window thereof, a plurality of long arcuate lenses of thick double convex cross section disposed in contiguous parallel relationship within said vessel against said wall thereof, each said lens having a curvature and position at which the optical axis of any cross section of the lens is directed substantially toward said light source, a plurality of light reflecting bands one disposed on each said lens on the convex face thereof which is furtherest from said light source, and a substantially light-tight enclosure surrounding said vessel and said light source whereby substantially no light reaches a viewing point situated outside the conical volume defined by said source as an apex and said vessel wall as a base except light which has been returned toward said source by said lenses and scattered by said tracks.

8. In a dark-field optical system for use in a nuclear particle detector of the class forming particle tracks within a fluid medium, which fluid medium is contained within a vessel having a transparent window, the combination comprising a light source directing said light into said vessel through said transparent window thereof, a plurality of ninety degree Porro prisms disposed within said vessel against the wall thereof situated opposite said window, said prisms being contiguously arrayed over a substantial area of said wall, each said prism being oriented with a hypotenuse face thereof substantially normal to a straight line between said light source and said hypotenuse face, and means defining a viewing point outside said transparent window and outside the substantially conical region having as a base said prism covered area of said vessel wall and having as an apex said light source whereby said viewing point receives retro-directed light scattered by said particle tracks.

9. A dark-field illumination system for use in a single window bubble chamber nuclear particle detector wherein charged particle tracks are produced in an ionizing radiation sensitive fluid medium, said fluid medium being contained within a vessel having at one end thereof a transparent window and having a light absorbent interior surface, comprising, in combination, a light source situated forwardly outside said window and directing light through said window into said vessel toward the interior surface of said vessel opposite said window, a plurality of ninety degrees Porro prisms contiguously arrayed over said interior surface of said endwall, each said prism being oriented with the hypotenuse face normal to direct light from said source, means establishing an observation point outside said transparent window of said vessel and outside the solid angle defined by said source and said prism covered endwall of said vessel whereby said point receives light refracted by said particle tracks after said light has been retro-directed by said prisms, and a light-tight enclosure surrounding said vessel and said light source and said observation point whereby ambient light is excluded.

10. In a dark-field optical system for use in a single window bubble chamber charged particle detector wherein particle tracks are produced in a radiation sensitive fluid medium, said fluid medium being contained within a cylindrical vessel having a transparent window at one end thereof and having a light absorbent interior surface, said vessel being disposed within a light-tight enclosure of substantially larger size, the combination comprising a light source disposed within said light-tight enclosure outside said transparent window of said vessel, said light source projecting light through said transparent window into said vessel toward the endwall of said vessel opposite said window thereof, a plurality of ninety degree Porro prisms contiguously arranged in an array substantially covering said interior endwall with the hypotenuse faces thereof oriented substantially normal to said light from said light source, and means mounting a camera within said light-tight enclosure in proximity to said light source and outside the conical region defined by said source and said vessel endwall whereby said camera receives only that light refracted by said particle tracks after being retro-directed by said prisms.

References Cited in the file of this patent

UNITED STATES PATENTS

| | | |
|---|---|---|
| 2,362,235 | Barnes | Nov. 7, 1944 |
| 2,713,286 | Taylor | July 19, 1955 |
| 2,899,557 | Wilson | Aug. 11, 1959 |
| 2,900,518 | Good | Aug. 18, 1959 |

FOREIGN PATENTS

| | | |
|---|---|---|
| 784,822 | Great Britain | Oct. 16, 1957 |

OTHER REFERENCES

"Liquid Hydrogen Bubble Chambers," Parmentier et al., The Review of Scientific Instruments, vol. 26, No. 10, October 1955.